(12) United States Patent
Plattner et al.

(10) Patent No.: US 9,542,445 B2
(45) Date of Patent: Jan. 10, 2017

(54) USING OBJECT AWARENESS FOR A JOIN PRUNING MECHANISM

(71) Applicant: Hasso-Plattner-Institut für Softwaresystemtechnik GmbH, Potsdam (DE)

(72) Inventors: Hasso Plattner, Schriesheim (DE); Stephan Mueller, Potsdam (DE); Jens Krueger, Oranienburg (DE); Juergen Mueller, Berlin (DE); Anisoara Nica, Ontario (CA)

(73) Assignee: Hasso-Plattner-Institut Fur Softwaresystemtechnik GmbH, Potsdam (DE)

( * ) Notice: Subject to any disclaimer, the term of this patent is extended or adjusted under 35 U.S.C. 154(b) by 284 days.

(21) Appl. No.: 14/291,594

(22) Filed: May 30, 2014

(65) Prior Publication Data
US 2015/0120698 A1 Apr. 30, 2015

Related U.S. Application Data

(60) Provisional application No. 61/897,877, filed on Oct. 31, 2013.

(51) Int. Cl.
*G06F 17/30* (2006.01)
(52) U.S. Cl.
CPC ... *G06F 17/30498* (2013.01); *G06F 17/30592* (2013.01)
(58) Field of Classification Search
None
See application file for complete search history.

(56) References Cited

U.S. PATENT DOCUMENTS

2012/0254252 A1* 10/2012 Jin ............... G06F 17/30592 707/797
2014/0156635 A1* 6/2014 Grochowski ..... G06F 17/30466 707/714

OTHER PUBLICATIONS

Stephan Muller, et al.; "Efficient View Maintenance for Enterprise Applications in Columnar In-Memory Databases"; 14th Annual IEEE International Enterprise Distributed Object Computer Conference (EDOC); 2013; 10 pages.
Randall G. Bello, et al.; "Materialized Views in Oracle"; Proceedings of the 24th Very Large Database Conference; 1998; pp. 659-664 (6 pages).
Per-Ake Larson, et al.; "Efficient Maintenance of Materialized Outer-Join Views"; 23rd Annual IEEE International Conference on Data Engineering; 2007; 10 pages.
Hasso Plattner; "A Common Database Approach for OLTP and OLAP Using an In-Memory Column Database"; Special Interest Group on Management of Data (SIGMOD) Conference; 2009; 7 pages.

(Continued)

*Primary Examiner* — Bai D. Vu
(74) *Attorney, Agent, or Firm* — Fountainhead Law Group P.C.

(57) ABSTRACT

The invention relates to a computer system and a corresponding method and a corresponding computer-readable medium. The computer system is suitable for determining the result of a join. Based on the access pattern of an application, the computer system infers that a particular subjoin is empty. The computer system then excludes the inferred-empty subjoin when performing the join, performing a more efficient and faster database join operation.

18 Claims, 10 Drawing Sheets

(56) References Cited

OTHER PUBLICATIONS

Hasso Plattner; "SanssouciDB: An In-Memory Database for Processing Enterprise Workloads"; 2011; 20 pages.
John Miles Smith, et al.; "Database Abstractions: Aggregation and Generalization"; ACM Transactions on Database Systems, vol. 2, No. 2; 1977; pp. 105-133 (29 pages).
O. Peter Buneman, et al.; "Efficiently Monitoring Relational Databases"; ACM Transactions on Database Systems, vol. 4, No. 3; 1979; pp. 368-382 (15 pages).
Alfons Kemper, et al.; "HyPer: A Hybrid OLTP&OLAP Main Memory Database System Based on Virtual Memory Snapshots"; International Conference on Data Engineering (ICDE) Conference; 2011; pp. 195-206 (12 pages).
Ashish Gupta, et al.; "Maintenance of Materialized Views: Problems, Techniques, and Applications"; IEEE Data Engineering Bulletin; 1995; 16 pages.
Himanshu Gupta, et al.; "Incremental Maintenance of Aggregate and Outerjoin Expressions"; Department of Computer Science, State University of New York; 2006; 29 pages.
Martin Grund, et al.; "HYRISE—A Main Memory Hybrid Storage Engine"; Proceedings of the 37th International Conference on Very Large Databases; 2011; pp. 105-116 (12 pages).
Jose A. Blakeley, et al.; "Efficiently Updating Materialized Views"; Association of Computing Machinery (ACM); 1986; p. 61-71 (11 pages).
Franz Farber, et al.; "SAP HANA Database—Data Management for Modern Business Applications"; Special Interest Group on Management of Data (SIGMOD) Record, vol. 40, No. 4; 2011; pp. 45-51 (7 pages).
David Srivastava, et al.; "Answering Queries with Aggregation Using Views"; Proceedings of the 22nd Very Large Database Conference; 1996; pp. 318-329 (12 pages).
Jingren Zhou, et al.; "Lazy Maintenance of Materialized Views"; Proceedings of the Very Large Database Conference; 2007; pp. 231-242 (12 pages).
Jens Krueger, et al.; "Fast Updates on Read-Optimized Databases Using Multi-Core CPUs"; Proceedings of the 38th International Conference on Very Large Databases; 2012; pp. 61-72 (12 pages).
U.S. Appl. No. 14/176,711, filed Feb. 10, 2014 entitled "Aggregate Query-Caching in Databases Architectures with a Differential Buffer and a Main Store", 96 pages.

\* cited by examiner

USING OBJECT AWARENESS FOR A JOIN PRUNING MECHANISM

CROSS-REFERENCE TO RELATED APPLICATIONS

This application claims priority to U.S. Provisional App. No. 61/897,877 filed Oct. 31, 2013, which is incorporated herein by reference

FIELD OF THE INVENTION

This invention relates to the field of databases. In particular, it relates to the field of special-purpose programming languages designed for managing data held in a relational database management system (RDBMS). Even more particularly, the invention relates to an implementation of a Join operation, such as a Join operation in the database language; such as the Structured Query Language (SQL).

A logic join operation combines records from two or more tables in a database. It creates a set that can be saved as a table or used as it is. A join operation is a means for combining fields from two tables by using values common to each. A join statement is written in order to identify the records for joining. If the evaluated predicate is true, the combined record is then produced in the expected format, a record set or a temporary table. It is to be noted that a logic join operation between more than two tables is typically implemented by concatenating joins between two tables. For logically joining three tables, initially, the first table and second table are joined via an elementary join operation. Then, the result thereof is joined with the remaining third table to produce the final result of the logic join.

Relational databases are usually normalized to eliminate duplication of information such as when objects have one-to-many relationships. For example, a "Department" may be associated with a number of "Employees". Joining separate tables for "Department" and "Employee" effectively creates another table which combines the information from both tables. This is at some expense in terms of the time it takes to compute the join. While it is possible to simply maintain a denormalized table if speed is important, duplicate information may take extra space, and add the expense and complexity of maintaining data integrity if data which is duplicated later changes.

PRIOR ART

There is a high need for efficient implementations of the join operation. This will be demonstrated with reference to database systems that handle a mixed workload of both online transactional processing (OLTP) and online analytical processing (OLAP).

Previously, enterprise applications have been separated into online transactional processing (OLTP) and online analytical processing (OLAP). For example, a financial accounting application has been divided into the core application dealing with the creation of financial documents and short-term reports, while a separate business intelligence application is concerned with running a full range of analytics that were not feasible to run directly on the transactional data. The drawbacks of this separation are complex and costly extract-transform-load-(ETL)-processes, non-up-to-date and redundant data. Further, the analytical applications are often limited in their flexibility due to pre-calculated data cubes with materialized aggregates.

With the rise of columnar in-memory databases (IMDB) such as SAP HANA, Hyrise, and Hyper, this artificial separation is not necessary anymore as they are capable of handling mixed workloads, comprised of transactional and analytical queries on a single system. For details, please refer to:

Plattner, H.: A common database approach for oltp and olap using an in-memory column database. In: SIGMOD. (2009) 1-2;

Färber, F., Cha, S. K., Primsch, J., Bornhövd, C., Sigg, S., Lehner, W.: SAP HANA database: data management for modern business applications. SIGMOD (2011);

Grund, M., Krüger, J., Plattner, H., Zeier, A., Cudre-Mauroux, P., Madden, S.: Hyrise: a main memory hybrid storage engine. VLDB (2010) 105-116; and Kemper, A., Neumann, T., Informatik, F. F., München, T. U., D-Garching: Hyper: A hybrid oltp & olap main memory database system based on virtual memory snapshots. In: ICDE. (2011).

Plattner, H.: Sanssoucidb: An in-memory database for processing enterprise workloads. In: BTW. (2011)

In fact, modern enterprise applications execute mixed workloads with both transactional and analytical queries. While the transactional queries are mostly inserts or single selects, the analytical queries are often comprised of costly data aggregations. Having the possibility to run flexible, adhoc analytical queries directly on transactional data with sub-second response times will further lead to an increased workload of aggregate queries. For details, please refer to:

Smith, J. M., Smith, D. C. P.: Database abstractions: Aggregation. Commun. ACM 1977.

To speed up the execution of OLAP-queries, in particular involving aggregations, maintaining materialized views (e.g., a denormalized table that corresponds to a query and is physically stored in the database) for frequently serviced OLAP-queries have been proposed. This is because accessing a materialized aggregate is always faster than servicing a query on-the-fly. However, the overhead of materialized view maintenance has to be considered which is needed to ensure data consistency when the base data is changed. This problem is intensified by the requirement that a maintenance downtime is not acceptable in mixed workload environments. For details, please refer to:

Gupta, A., Mumick, I. S.: Maintenance of materialized views: Problems, techniques, and applications. IEEE Data Eng. Bull. 1995; and Srivastava, D., Dar, S., Jagadish, H., Levy, A.: Answering queries with aggregation using views. In: VLDB. (1996).

Materialized view maintenance strategies have been developed and are applicable in columnar IMDBs. For details, please refer to:

Buneman, O. P., Clemons, E. K.: Efficiently monitoring relational databases. ACM Transactions on Database Systems (1979);

Blakeley, J. A., Larson, P. A., Tompa, F. W.: Efficiently updating materialized views. In: SIGMOD. (1986) 61-71;

Bello, R. G., Dias, K., Downing, A., Jr., J. J. F., Finnerty, J. L., Norcott, W. D., Sun, H., Witkowski, A., Ziauddin, M.: Materialized views in oracle. In: VLDB. (1998) 659-664;

Zhou, J., Larson, P. A., Elmongui, H. G.: Lazy maintenance of materialized views. In: VLDB. (2007) 231-242];

Gupta, H., Mumick, I. S.: Incremental maintenance of aggregate and outerjoin expressions. Information Systems 31(6) (September 2006) 435-464; and Larson, P. A., Zhou, J.: Efficient Maintenance of Materialized Outer-Join Views. In: 2007 IEEE 23rd International Conference on Data Engineering, IEEE (2007) 56-65].

The architecture of IMDBs, such as SAP HANA, Hyrise, and Hyper, is particularly well-suited for a recently developed strategy, which involves caching aggregate queries and applying incremental view maintenance techniques. The applicant has recently filed a European patent application relating to this strategy, the application having the application No. 14154565 and the title "Aggregate Query-Caching in Databases Architectures with a Differential Buffer and a Main Store". A corresponding US patent application having the application Ser. No. 14/176,711 and the title "Aggregate Query-Caching in Databases Architectures with a Differential Buffer and a Main Store" has also been filed. The content of both applications is herewith incorporated by reference. On a high level, the architecture of the abovementioned IMDBs is as follows: data tables are horizontally partitioned into read-optimized main storages and write-optimized delta storages. The main storage is highly-compressed and not optimized for inserts, whereas the delta storage is optimized for inserts but not optimized slower with regard read-outs. High-throughput is ensured by performing all data changes on tables at the respective delta storage. Because the delta storage is so wasteful in terms of memory consumption, the data contained in the delta storage is periodically moved to the respective main storage in a process called merge operation. The strategy disclosed in the abovementioned patent application "Aggregate Query-Caching in Databases Architectures with a Differential Buffer and a Main Store" now suggests maintaining materialized aggregates only with regard to the data stored in the main storage. This has the advantage that these materialized aggregates do not have to be invalidated when new records are inserted to the delta storage. To retrieve an up-to-date result, i.e., a result that also takes all data modifications stored in the delta storage into account, the records inserted in the delta storage are queried (in particular, aggregated) on-the-fly and combined—for example, using a SQL UNION ALL statement—with the materialized aggregate. This strategy tremendously reduces the computing time required for cached queries and requires very little maintenance effort. For more details, please refer to:

Müller, S., Butzmann, L., Höwelmeyer, K., Klauck, S., Plattner, H.: Efficient View Maintenance for Enterprise Applications in Columnar In-Memory Databases. EDOC (2013); and Krueger, J., Kim, C., Grund, M., Satish, N., Schwalb, D., Chhugani, J., Plattner, H., Dubey, P., Zeier, A.: Fast Updates on Read-Optimized Databases Using Multi-Core CPUs. In VLDB. (2012)

As to the terminology used herein, the result of a query is also referred to as "view". A cached result of a query is also referred to as "materialized view". When calculating a query requires calculating at least one aggregation function, then a cached result of this query is referred to as "materialized aggregate".

The strategy suggested in the abovementioned patent application "Aggregate Query-Caching in Databases Architectures with a Differential Buffer and a Main Store" is very efficient for queries against one-table schemas. However, for queries against multiple-table-schemas (i.e., a query that involves joining multiple tables), in order to make use of materialized aggregates, subjoins between all permutations of delta partitions and main partitions of the involved tables, excluding the join between all main partitions (which is cached in the database as materialized aggregate), have to be calculated. Hence, for a query joining two tables, three subjoins are required, and a query joining three tables already requires seven subjoins. It is to be noted that the main partition may be huge. For example, a main partition may contain billions of records. It is evident that subjoins involving the main partition may be computational expensive and may slow down the aggregate cache strategy so significantly that only little performance is gained over not using the aggregate cache defined on the main partitions.

An alternative approach of joining two tables, each partitioned into a main and a delta partition, is to first combine the delta and the main partition of each table (for example, by means of a union operation) and subsequently joining the results thereof. This approach, however, cannot make use of cached materialized aggregates between all main partitions.

Therefore, it is the object of the invention to provide an implementation of a more efficient and faster database join operation.

SUMMARY OF THE INVENTION

This object is achieved by a computer system, a method, and a computer-readable medium according to the invention.

The invention relates to computer system having the features of claim 1. This computer system is suitable for determining the result of a join. The computer system may be distributed system.

The computer system comprises a processing unit. The processing unit may consist of one or more processors. The processing unit may also be distributed or located at one site in its entirety.

The computer system further comprises a database coupled to the processing unit. The database in turn comprises a first table, and a second table, each of the first and second table being partitioned into at least two partitions, namely a respective first and a respective second partition.

The database is coupled to an application that, in operation, accesses the database according to an access pattern. This application may be an enterprise application that puts both transactional and analytical workloads on the database of the computer system.

The access pattern of the application, also referred to as the "workload of the application", is any set of operations on the database, including both read and write operations, that the application, such as an enterprise application, may generate over its lifetime. This access pattern of the application is governed by the objects, such as business objects, that the application stores and modifies in the database. This access pattern of the application leads to a particular pattern of the data stored in the database, which can be made use of for inferring that the result of subjoins between partitions is empty.

The computer system further comprises a database engine executable by the processor and communicatively coupled to the database. The database engine is configured for determining a join of the first and the second table by determining the results for a plurality of subjoins. Preferably, each subjoin is a join between a partition of the first table and a partition of the second table; and combining (∪) at least those determined results that are not empty (∅).

Preferably, the step of combining is performed with a union operator of the database engine, such as SQL union.

Preferably, the join to be determined is an inner join, more preferably with an equality operator in the join-predicate (equi-join). In an example of a query involving a join of two tables, each partitioned into two partitions, the database engine internally has to do more than just one join in order to retrieve a complete result set. The first partitions of the tables, the second partitions of the tables and each combination between the first partition of one table and the second partition of the other table need to be joined. Each of these individual joins between two partitions is referred to as "subjoin". For the example with two tables, the results of four subjoins have to be determined. The term "determining" a subjoin is to be understood in its broadest sense so that it includes any way of establishing the result for the subjoin. This includes actually running an elementary join operation on two partitions to be joined (referred to as "explicitly determining" the result of the join by means of an elementary join operation) or retrieving the result from a cache store. This, however, also includes inferring the results by other means, such as by determining that one of the partitions to be joined is empty or by inferring that the result is empty from the access pattern of the application.

The database engine is configured for determining the result of at least one of the plurality of subjoins by inferring from the access pattern of the application that this result is empty (Ø). This does not exclude that properties of the data stored in the partitions at the time of joining (i.e., at join runtime) are retrieved and taken into account (this is also referred to as dynamic pruning). According to one advantageous embodiment, the maximum value contained in a column of one of the two partitions to be joined and the minimum value contained in a column of the other one of the two partitions to be joined are retrieved and used to infer from the access pattern of the application that the result of the join between the two partitions is empty. Preferably, at least one of the maximum value and minimum value is retrieved from a dictionary associated with the respective column so that retrieval is fast and it doesn't access the data itself. More preferably, this dictionary is a sorted dictionary so that retrieval of the value is even faster. According to another advantageous embodiment, no properties of data stored in the partitions at the time of joining (i.e., at join runtime) are retrieved and taken into account (this is also referred to as logical pruning). For example, a subjoin between the first partition of one table and the second partition of the other table may always be empty. This can be inferred from the access pattern without retrieving properties relating to the data stored in the partition to be joined at the time of joining.

This computer system is advantageous in the context of joins between partitioned tables in general because join processes are speed up by avoiding unnecessary access to potentially large partitions. Instead of explicitly determining the result by running a conventional join operation between two partitions, the result is determined by inference from the access pattern. This computer system is particularly advantageous when the application coupled to the database is an enterprise application that puts both transactional and analytical workloads on the database of the computer system and the database employs an aggregate cache mechanism. This is because joins of partitioned tables are challenging in general but slow down both the incremental materialized view maintenance of the aggregate cache in particular and the query performance when the aggregate cache is used. According to the inventors' analysis of enterprise applications, these enterprise applications typically follow a certain database access pattern, i.e., a pattern concerning their schema design and usage. For example, business objects are persisted using a header and item table with additional rather static dimension and configuration tables. Moreover, related header and item records are typically inserted within a single transaction or at least within a small time window. According to the invention, this access pattern of applications is used in order to optimize the join processing. This is done by inferring from the access pattern of the application that the result of a subjoin is empty (Ø) and "pruning" this subjoin, "pruning" meaning that the subjoin is not explicitly performed by running a database join operation on the two concerned partitions. This eliminates a potentially expensive explicit join between two partitions of two tables to be joined.

Advantageous embodiments of the computer system according to claim 1 are laid out in the dependent claims 2-12.

According to an advantageous embodiment of the computer system, the join to be determined is an inner join, preferably with an equality operator in the join-predicate (equi-join).

According to an advantageous embodiment of the computer system, the join has a join condition, and the access pattern is such that tuples in the first and the second table are stored so that a tuple in the first table and a tuple in the second table that match according to the join condition are both either in the respective first partition or the respective second partition preferably so that it can be inferred from the access pattern that the result of the subjoin between a first partition of one of the tables and a second partition of the other of the tables is empty (Ø). Preferably, the database engine is further configured for merging content from the first partitions into the second partitions so that this property is maintained, i.e., that a tuple in the first table and a tuple in the second table that match according to the join condition are both either in the respective first partition or the respective second partition.

According to an advantageous embodiment of the computer system, the computer system further comprises a high level API for data manipulation so that data manipulation on the database is restricted to this high level API, wherein the high level API enforces a certain data access pattern, such as the one discussed in the previous paragraph, wherein, advantageously, the database is only accessible via the high level API.

According to an advantageous embodiment of the computer system, the database engine is further configured for caching the result of a subjoin (this cached subjoin is typically the most expensive subjoin, which makes caching very advantageous) in a cache store; and determining the result of at least one of the plurality of subjoins from the cached result for the purpose of determining the join of the first and the second relation. According to another advantageous embodiment, the database engine comprises a cache controller for performing this step, the cache controller preferably being one of the cache controllers described in in the European patent application with the application No. 14154565 and the title "Aggregate Query-Caching in Databases Architectures with a Differential Buffer and a Main Store" or in the US patent application with the application Ser. No. 14/176,711 and the title "Aggregate Query-Caching in Databases Architectures with a Differential Buffer and a Main Store".

According to an advantageous embodiment of the computer system, the database engine is configured for determining the result of at least one of the plurality of subjoins is empty (Ø) by determining that one or more of the partitions corresponding to the at least one subjoin is empty. Often the delta partitions of dimension, text, and configuration tables are empty. The checks whether such a partition is empty or not are very cheap in computational terms and may avoid an expensive subjoin. It is to be noted that "determining that one or more of the partitions corresponding to the at least one subjoin is empty" is not to be understood as "inferring from the access pattern of the application that this result is empty" because no inference is made from the access pattern. Rather, it is directly checked whether one of the partitions to be joined is empty.

According to an advantageous embodiment of the computer system, the database engine is configured for determining the results of all those subjoins, that cannot be determined by one of inference from the access pattern or retrieving a cached result or determining that one of the partitions to be joined is empty, by executing a join operation on the corresponding partitions of the first and the second relation.

According to an advantageous embodiment of the computer system, the database engine is further configured for merging the content of the first partition into the second partition. Preferably, thereby, those properties of the data stored in the partitions that are imposed by the access pattern and that are used for inference are maintained.

According to an advantageous embodiment of the computer system, each of the first and the second table has a special column. The access pattern is such that the result of a subjoin between one partition of the first table and one partition of the second table is empty (Ø) if the interval between the minimum value and the maximum value contained in the special column of the one partition of the first table is further than an access pattern distance (d) apart from the interval between the minimum value and the maximum value contained in the special column of the one partition the second relation. Then, determining that the result of a subjoin is empty can be performed by adding a special (temporal) attribute during insertion time and use that, including the minimum and maximum values of the corresponding partitions, to check whether the result of the join is empty. This works because, according to the inventors' analysis of enterprise applications, enterprise applications typically follow a certain database access pattern, i.e., a pattern concerning their schema design and usage. For example, business objects are persisted using a header and item table with additional rather static dimension and configuration tables. Moreover, related header and item records are typically inserted within a single transaction or at least within a small time window. According to the invention, this access pattern of applications is used in order to optimize the join processing. This is done by by inferring from the access pattern of the application that the result of a subjoin is empty (Ø) and "pruning" this subjoin, "pruning" meaning that the subjoin is not explicitly performed by running a database join operation on the two concerned partitions. This eliminates a potentially expensive join between two partitions of two tables to be joined. Benchmark results show that this approach induces a small overhead for record insertion, the execution of a cached join query using the pruning approach outperforms the non-pruning approach by an average factor of three. Further, this approach is particularly advantageous because the join attribute can be chosen insofar arbitrarily as the join attribute in one of the tables to be joined uniquely identifies a tuple of the other table to be joined, i.e. it is a foreign key. Therefore, the join attribute does not necessarily have to be the attribute used for partitioning into a main and delta partition. This is discussed in more detail below in the context of matching dependency methods.

According to an advantageous embodiment of the computer system, the special column is configured for storing a special attribute, preferably an attribute relating to a temporal property, such as a transaction identifier, an auto-incremented value, or a timestamp of tuple insertion.

According to an advantageous embodiment of the computer system, the access pattern is such that, when a new tuple is inserted into the first and second table, the value is either always larger or always smaller than any other value existing already in the special column.

According to an advantageous embodiment of the computer system, the step of inferring from the access pattern of the application the result of at least one of the plurality of subjoins is empty (Ø) includes: determining that the interval between the minimum value and the maximum value contained in the special column of the partition of the first table is further than an access pattern distance (d) apart from the interval between the minimum value and the maximum value contained in the special column of the partition of the second table, for example, by evaluating at least one of the following expressions:

$$\max(R_1[\text{tid}_A])+d<\min(S_2[\text{tid}_A]) \text{ OR } \min(R_1[\text{tid}_A])>\max(S_2[\text{tid}_A])+d;$$

$$\max(R_1[\text{tid}_A])+d<\min(S_1[\text{tid}_A]) \text{ OR } \min(R_1[\text{tid}_A])>\max(S_1[\text{tid}_A])+d;$$

$$\max(R_2[\text{tid}_A])+d<\min(S_2[\text{tid}_A]) \text{ OR } \min(R_2[\text{tid}_A])>\max(S_2[\text{tid}_A])+d;$$

$$\max(R_2[\text{tid}_A])+d<\min(S_1[\text{tid}_A]) \text{ OR } \min(R_2[\text{tid}_A])>\max(S_1[\text{tid}_A])+d.$$

According to an advantageous embodiment of the computer system, the step of inferring from the access pattern of the application the result of at least one of the plurality of subjoins is empty (Ø) includes: determining the maximum value contained in the special column for one of the two partitions and determining the minimum value contained in the special column for the other one of the two partitions of this subjoin, for example, by means of the SQL Max( ) and Min( ) functions. Preferably, at least one of the determined maximum value and minimum value is retrieved from a dictionary associated with the respective column so that retrieval is fast. More preferably, this dictionary is a sorted dictionary so that retrieval of the value is even faster. According to an advantageous embodiment of the computer system, the access pattern of the application is such that it is sufficient to determine the maximum value contained in the special column for one of the two partitions and the minimum value contained in the special column for the other one of the two partitions of this subjoin because it can be inferred from the access pattern of the application that the upper boundary of the interval between the minimum value and the maximum value contained in the special column of the partition of the first table is always above the lower boundary of the interval between the minimum value and the maximum value contained in the special column of the partition of the second table.

According to an advantageous embodiment of the computer system, the database engine comprises a prefilter engine for carrying out the step of inferring from the access pattern of the application the result of at least one of the plurality of subjoins is empty (Ø).

According to an advantageous embodiment of the computer system, the access pattern distance (d) is 0.

According to an advantageous embodiment of the computer system, the access pattern distance (d) is larger than 0.

According to an advantageous embodiment of the computer system, the database engine is further configured for revalidation processing of join queries when invalidations are detected in the main storage. Preferably, thereby, matching dependencies are preserved by artificially updating dependent records, thereby moving them from the first to the second partition.

According to an advantageous embodiment of the computer system, the application access pattern is insert-only so that data is inserted into multiple tables in the context of a single transaction, and accessed in a read-only manner afterwards.

According to another embodiment of the computer system, parts of the data stored in the database can be modified by individual update transactions at any point in time. Additional care needs to be taken that all of the matching dependencies are preserved. According to one embodiment, the corresponding records are artificially "updated" in other tables. Then, the invalidated records in the main storage may be considered to be a third partition besides the partitions with visible records in the main and delta storage. Given this third partition, the described partition pruning approach can be applied in the same way. Alternatively, the query could be calculated from scratch.

According to another embodiment of the computer system, the access pattern is such that header and items of business objects that belong together are always either all in delta or main. The database engine can then leverage the access pattern to limit any join accessing business objects to joining the deltas and mains of the header and item table.

According to another advantageous embodiment of the computer system, the computer system is one of the computer systems described in the European patent application with the application No. 14154565 and the title "Aggregate Query-Caching in Databases Architectures with a Differential Buffer and a Main Store" or in the US patent application with the application Ser. No. 14/176,711 and the title "Aggregate Query-Caching in Databases Architectures with a Differential Buffer and a Main Store".

According to another advantageous embodiment of the computer system, the database is one of the databases described in described in the European patent application with the application No. 14154565 and the title "Aggregate Query-Caching in Databases Architectures with a Differential Buffer and a Main Store" or in the US patent application with the application Ser. No. 14/176,711 and the title "Aggregate Query-Caching in Databases Architectures with a Differential Buffer and a Main Store". Preferably, the first partition is a main store as described in these applications, and the second partition is a differential buffer as described in these applications.

According to another advantageous embodiment of the computer system, the database is configured to determine the join in response to one of the queries described in the European patent application with the application No. 14154565 and the title "Aggregate Query-Caching in Databases Architectures with a Differential Buffer and a Main Store" or in the US patent application with the application Ser. No. 14/176,711 and the title "Aggregate Query-Caching in Databases Architectures with a Differential Buffer and a Main Store". Preferably, the database is configured to determine the join in response to one of the aggregate queries described in these applications.

Further, the invention relates to a method for determining the result of a join, the method having the features of claim 13.

Finally, the invention relates to a non-transitory machine-readable medium storing a computer program that when executed by a computer system implements the method according to claim 14. The computer system includes a processor and a memory.

DESCRIPTION OF THE DRAWINGS

Like reference symbols in the various drawings indicate like elements.

DETAILED DESCRIPTION

Figure 1:
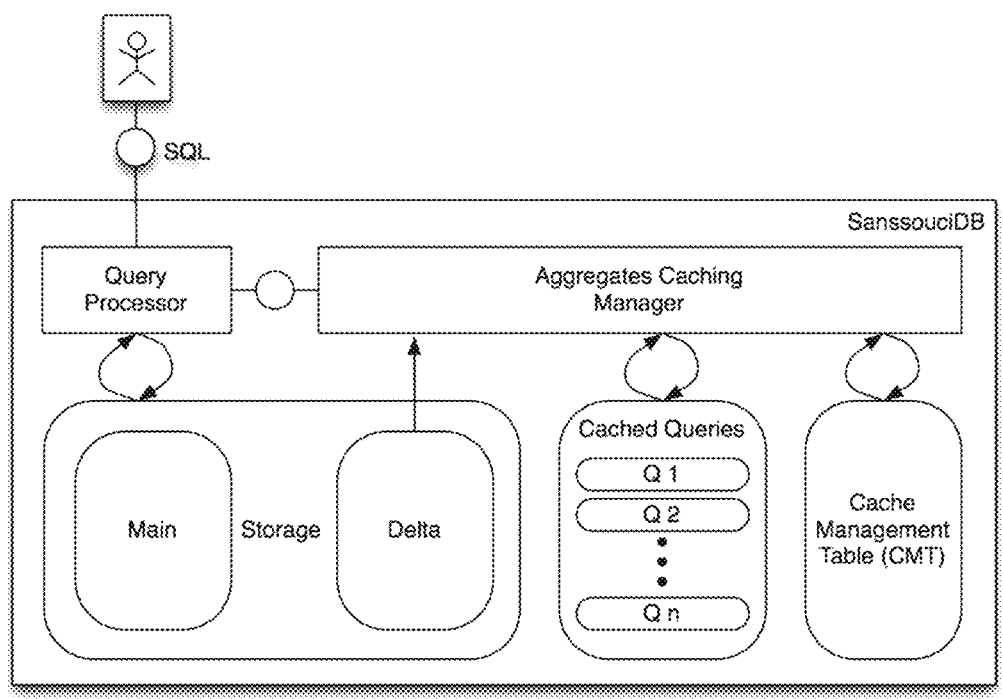
FIG. 1 shows an architecture of a computer system according to the invention as a fundamental modeling concept (FMC) diagram.

In the following description, for the purpose of explanation, example embodiments of the invention are described. The specific details are set forth in order to provide a thorough understanding of the example embodiments. It will be evident, however, to one skilled in the art that the present invention may be practiced without these specific details. In particular, the invention does not need to be implemented in a database with the so-called "Aggregate Cache Strategy". Rather, the invention can be made use of in any scenario, where a join between at least two tables, each table being partitioned into a first and a second partition, needs to be calculated.

The example embodiments relate to a computer system with a database, as described in chapter A. This computer system employs a caching strategy for queries against its database, which is referred to as "Aggregate Cache Strategy". This strategy and its architectural implementation are explained in chapter B. According to the invention, the database of the computer system is coupled to an application. The application, the database schema it employs and its usage pattern are described in chapter C. The application coupled to the database has an access pattern, which is described in chapter D. Joins between a plurality tables, each of the tables being partitioned into a main and a delta partition are described in chapter E. Finally, experimental data is shown and discussed in chapter F.

A. Computer System Coupled to a Database

According to a preferred embodiment, the computer system is suitable for determining the result of a join. The computer system may be distributed system. The computer system comprises: a processing unit; a database coupled to the processing unit, the database comprising: a first table (R), and a second table (S), each of the first and second table being partitioned into at least two partitions, namely a respective first ($R_1$, $S_1$) and a respective second partition ($R_2$, $S_2$), the database being coupled to an application that, in operation, accesses the database according to an access pattern; and a database engine executable by the processor and communicatively coupled to the database, the database engine being configured for determining a join ($R \bowtie_{R[A]=S[A]} S$) between the first and the second table by: determining the results for a plurality of subjoins ($R_1 \bowtie_{R[A]=S[A]} S_1$, $R_2 \bowtie_{R[A]=S[A]} S_2$, $R_1 \bowtie_{R[A]=S[A]} S_2$, $R_2 \bowtie_{R[A]=S[A]} S_1$); and combining ($\cup$) at least those determined results that are not empty ($\emptyset$). The database engine is further configured for determining the result of at least one of the plurality of subjoins by inferring from the access pattern of the application that this result is empty ($\emptyset$).

B. Aggregate Cache Strategy

According to a preferred embodiment, the computer system employs a caching strategy for queries against its database, which is referred to as "Aggregate Cache Strategy". The aggregate cache strategy leverages the concept of the main-delta architecture in in-memory column stores. Separating a table into a main and delta storage has one main benefit: it allows having a read-optimized main storage for faster scans and a write-optimized delta storage for high insert throughput. All updates are performed into the delta storage and are periodically propagated into the main storage in an operation called merge. The fact that new records are added to the main storage only during a merge operation is leveraged by the aggregate cache which is designed to cache only the results computed on the main storage. For a current query using the aggregate cache, the records from the delta storage are aggregated on-the-fly and united with the corresponding cache entry to build the result set of the query.

B.1 Architecture Overview

FIG. 1 shows the example computer system, which has a query processor for handling reads and writes to and from the main and delta storage through the SQL interface from the application and delegates aggregate queries to the aggregates caching manager. Further, the example computer system has a cache management table (CMT). In case the CMT indicates that the current query has not been cached yet, the query is processed on the main and delta storage. The query result set from the main is being cached and an entry in the CMT is created. Finally the unified result sets from main and delta are delivered back to the application. As all new inserts are stored in the delta, an already cached query does only need to be executed on the delta storage and then being unified with the cached entry that holds the content of the main storage. Since the delta is far smaller than the main and retrieving a cached result takes little time, the aggregate cache can speedup analytical queries by order of magnitudes. The computer system includes a processor and a memory that implement the features shown in FIG. 1.

B.2 Joins

The join to be determined is an inner join, preferably with an equality operator in the join-predicate (equi-join). Each table is partitioned into a main partition and a delta partition. For a query involving a join of two tables, each partitioned into two partitions, the database engine internally has to do more than just one join in order to retrieve a complete result set. The mains of both tables need to be joined, both deltas, and both main-delta combinations of the two tables.

Figure 2:
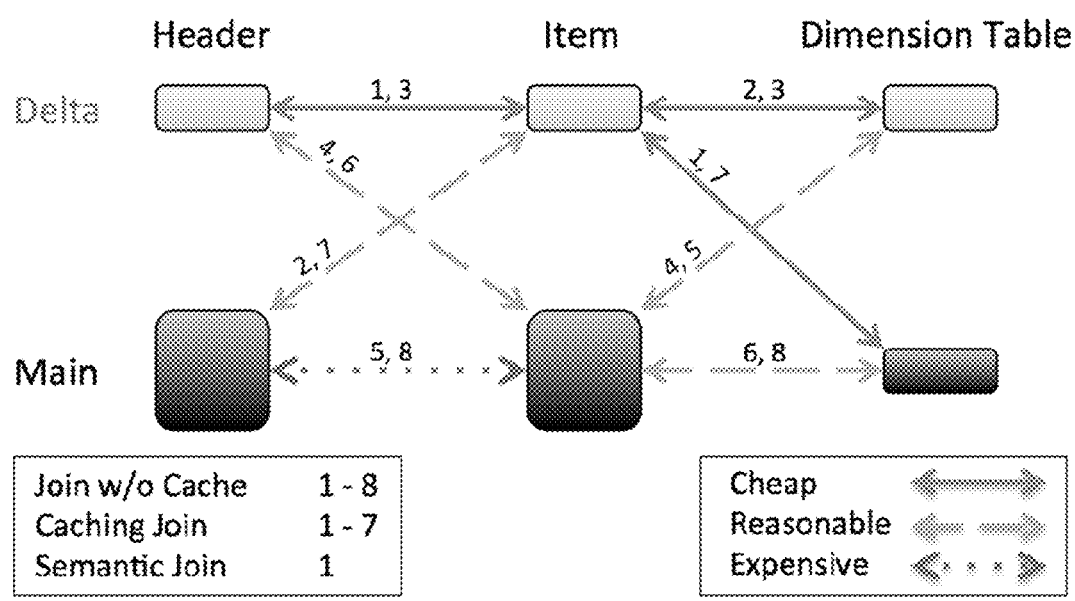
FIG. 2 shows an example of a join between three tables, a Header, Item and Dimension tables.

An example of a join between three tables, a header, item and dimension table, is shown in FIG. 2. Each of the numbers #1 to #8 represents a subjoin. To obtain the final result for the join, all subjoins need to be unified, for example using the UNION ALL SQL operator. When the aggregate cache is based on joins of multiple relations, the complexity of answering a query using the aggregate cache increases as the aggregate cache is computed on the main partitions only, and the query must be compensated with all subjoins on deltas and mains. The example aggregate query joining a header table H, an item table I, and dimension table D on the join conditions H[A]=I[A] and I[B]=D[B] is defined as follows: $Q(H; I;D) = H \bowtie_{H[A]=I[A]} I \bowtie_{I[B]=D[B]} D$.

In IMDBs, each table X consists of at least two partitions P(X)={Xmain; Xdelta} which adds complexity when the result of the query Q(H; I;D) is computed. This is because the join processing must consider all subjoin combinations among these partitions. Theoretically, the subjoins on delta and main partitions of the tables referenced in Q(H; I;D) are as depicted in the following equation $$Q(H;I;D) = (H_{delta} \bowtie_{H[A]=I[A]} I_{delta} \bowtie_{I[B]=D[B]} D_{main})_1$$

$$\cup (H_{main} \bowtie_{H[A]=I[A]} I_{delta} \bowtie_{I[B]=D[B]} D_{delta})_2$$

$$\cup (H_{delta} \bowtie_{H[A]=I[A]} I_{delta} \bowtie_{I[B]=D[B]} D_{delta})_3$$

$$\cup (H_{delta} \bowtie_{H[A]=I[A]} I_{main} \bowtie_{I[B]=D[B]} D_{delta})_4$$

$$\cup (H_{main} \bowtie_{H[A]=I[A]} I_{main} \bowtie_{I[B]=D[B]} D_{delta})_5$$

$$\cup (H_{delta} \bowtie_{H[A]=I[A]} I_{main} \bowtie_{I[B]=D[B]} D_{main})_6$$

$$\cup (H_{main} \bowtie_{H[A]=I[A]} I_{delta} \bowtie_{I[B]=D[B]} D_{main})_7$$

$$\cup (H_{main} \bowtie_{H[A]=I[A]} I_{main} \bowtie_{I[B]=D[B]} D_{main})_8 \quad \text{Equation (1):}$$

In Equation 1, there are eight brackets, each carrying an index, which runs from 1 to 8. Within the brackets are mathematical expressions of the subjoins that need to computed in order to compute the total result of the entire join to be determined. Therefore, the indices carried by the brackets match reference numbers #1 to #8 in FIG. 2.

For a typical join of an enterprise application, there may be more or less than three tables. Each of them may be partitioned into two partitions, namely a main and a delta. Typically, the ratio between the sizes of main and delta partitions is 100:1. In the example the subjoins #5 and #8 require the longest time, since they involve matching the join condition of the mains of two large tables. For example, the header table and the item table may be large and the dimension table may be small. Other examples for typically small tables are the configuration table and the text table. Based on the size of the involved table components, the time to execute the subjoins varies.

If the computer system does not provide aggregate caching for this particular query, the database engine needs to run the join on all possible main-delta combinations of all involved tables to build a complete result set. For a join between t tables, that adds up to a total of $2^t$ subjoins. As depicted in FIG. 2, for a join query involving three tables, this would mean unifying the result sets of eight sub joins. Based on the size of the involved table components, the time to execute the subjoins varies. In the displayed example the subjoins #5 and #8 require the longest computational time because they involve matching the join condition of the mains of two large tables.

If the computer system, however, does provide aggregate caching for this particular query, the result set from joining all main partitions is already calculated and the total number of subjoins is reduced to $2^t-1$. For the example, from FIG. 2, the subjoin #8 does not need to be rerun based on the cached result set. When the database does not know anything about the semantics of the involved tables and therefore their usage characteristics, it has to assume there could potentially be a newly inserted tuple in the delta of the Dimension table that could create a new match for the join of the HeaderMain and ItemMain. Based on their size, that join requires a lot of time though. The HeaderMain-ItemMain join need to be run even more often if there are more Dimension, Text or Configuration tables involved.

C. Access Pattern of the Application

In this chapter, example access patterns of an application coupled to the database are described. Such access pattern are defined by the schema design that the particular application is based on (Section C.1) and the usage pattern of the application, i.e., how the application accesses this schema (Section C.2).

C.1 Schema Design Pattern

The access pattern of an application is defined by the schema that the application makes use of. The example application makes use of a schema with a header table and an item table. In some embodiments, there are further tables, such as dimension, text, and configuration tables. The header table may describe common attributes of a single business transaction. E.g. for a sale in a financials system, it may store who made the purchase and when did the transaction take place. In materials management, for example, the header stores attributes common to a single movement of goods, such as the person who initiated the movement and the time of movement. With each header table entry, a number of tuples in an item table is associated. Item entries represent entities that are involved in a business transaction. For instance all products and the corresponding amount for a sale or materials and their amount for a goods movement. Additionally columns from the header and item tables refer to keys of a number of smaller tables. Based on their use case, they may be categorized into dimension, text and configuration tables. Dimension tables manage the existence of entities, like accounts and materials. Especially companies based in multiple countries have text tables to store strings for dimension table entities in different languages and lengths (e.g. product names). Configuration tables enable system adoption to customer specific needs, like how does the process of returning goods work in a company.

Figure 3:
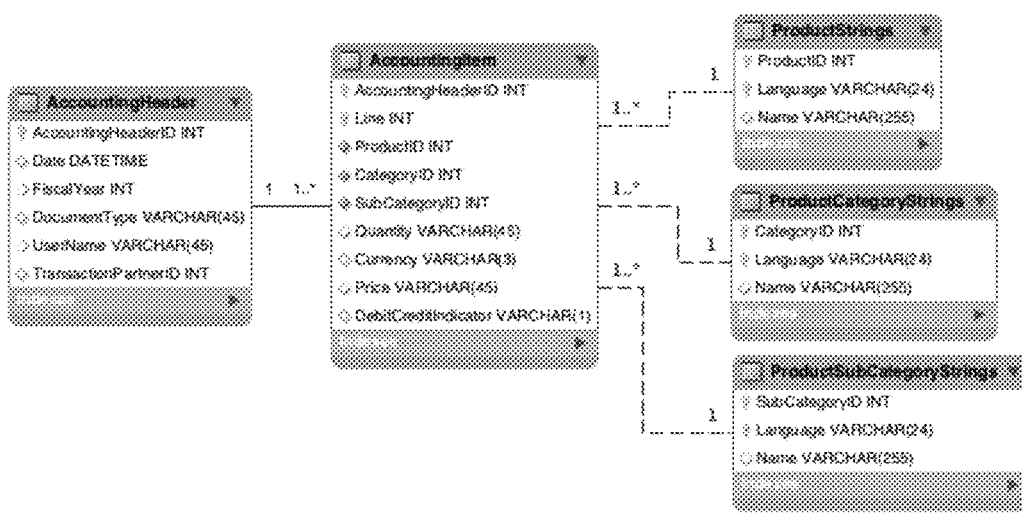
FIG. 3 shows a simplified extract of an example schema of an SAP financials application from an international company producing consumer goods.

FIG. 3 shows a simplified extract of an example schema of an SAP financials application from an international company producing consumer goods. An accounting header entry refers to a single business action, e.g. a sale or a purchase. This may include the time, type of accounting document, creator and business partner of the business action. The accounting item table lists all entities included in such a transaction, e.g. the items on an invoice. The text tables store the real names in different languages for the involved products and other item properties. In this example, the customer keeps product categories and subcategories on an item level to enable an in depth analysis of his financials.

C.2 Data Access Pattern

The access pattern of an application is also defined by the actual way that the application makes use of its schema. In this example, there is a high insert load from the enterprise application persisting business transactions (storing business transaction in the database). Each transaction is represented by one header tuple and a number of item tuples. Therefore, the header and item tables have a high insert rate and a large tuple count. Very frequently header entries are joined with their corresponding item entries. Additionally, the analytical queries extract strings from dimension or text tables. Item tuple values are aggregated according to methods described in configuration tables. The number of involved smaller tables varies between none to five. Those three table categories do have in common that there are rarely inserts, updates or deletes and that they contain only a few entries compared to header and item tables.

According to a first access pattern example, entire business objects are persisted in the context of a single transaction. Therefore, the header tuple and corresponding item tuples are inserted at the same point in time. E.g. sales or goods movement transactions are persisted as a whole in the database.

According to a second access pattern example, items are added or changed at a later point in time, e.g. when a customer adds products to his order.

According to a third access pattern example, entire business objects are only statically persisted in the context of a single transaction. Then, the header tuple and corresponding item tuples are inserted at the same point in time and never changed thereafter. In financial applications, for example, it is even required from a legal perspective that booked transaction cannot be deleted, but only changed with the insertion of a counter booking transaction.

D. Join Pruning Based on Application Access Pattern

In the following, an example of what is referred to as "Join Pruning" is described (Section D.1). Further, the theoretical foundation of Join Pruning is laid out (Section D.2). Finally, it is explained how the concept of matching dependencies can be used in order to base "Join Pruning" on temporal relationships between records stored in different tables to be joined (Section D.3).

D.1 Example for Join Pruning

As an illustrative example, let us assume a query joining a header and item table with a cached result set representing the joined main partitions. In case that entire business objects are only statically persisted in the context of a single transaction, business objects are inserted in the context of a single transaction, the header tuple and the corresponding item tuples are inserted together. If there was no merge yet, both tuples that will match the join condition are both in the delta partition of their table. Therefore, one only needs to run the HeaderDelta-ItemDelta join and unify the results with the cached entry. The main-delta combinations of Header and Item table can be avoided. Same holds true for the subjoins #2, #4, #6 and #7 of the example from FIG. 2 because the Header and Item tuples that belong together are either all in the main partitions or delta partitions of the tables. Because there has not been an insert, update or delete on the dimension table in a long time, the delta partition of that table is empty. For inner joins empty table components do not need to be included since they will not contribute to the result set. Therefore, the subjoins #2 and #3 can be avoided. This elimination method can also be applied if there are a greater number of involved dimension, text or configuration tables with empty deltas. This only leaves the join #1, between the HeaderDelta, ItemDelta and the main of the small Dimension table. Since all involved table components are small, the subjoin can be executed with little effort. The semantic join always only executes one subjoin using the HeaderDelta, ItemDelta and Dimension-, Text- and Configuration-Table-Mains.

Leaving out a subjoin when calculating a total join because it is known by other means than executing a join operation that the result of this subjoin is empty, is referred to as Join Pruning. This avoids accessing irrelevant data.

D.2 Theoretical Foundation of Join Pruning

In the following, the join pruning theoretical defined.

Join pruning can be performed based on the logical properties of the partitioning scheme (e.g., the definitions of the partitioning scheme), or on the current properties of the data stored in the tables to be joined during the query runtime. Logical partition pruning refers to methods of pruning based on the definitions of the partitioning scheme, while dynamic partition pruning is a method of pruning based on runtime properties of the data. While logical partition pruning can be done during query optimization, dynamic partition pruning can be applied only at query execution time as it is based on partition properties which hold for the current instance of the database.

The best Join Pruning Strategy can be obtained by implementing an extra column in each of the tables to be joined. This allows dynamic partition pruning during query execution.

A simple example of dynamic partition pruning for a join $R \bowtie S$ is pruning all subjoins (or pairs) of the form $R_j \bowtie S_k$ ($R_j$ and $S_k$ are partitions of R and S, respectively) if the partition $R_j$ is empty at the query execution time for a particular instance of the table R. The best plan for a query Q can be built such that this condition is checked before the execution for a subjoin $R_j \bowtie S_k$ is started. If the partition $R_j$ is empty, the subjoins $R_j \bowtie S_k$, for all $k \in \{1; \ldots m\}$, do not have to be computed during the execution of the query.

Definition 1: A horizontal partitioning of a table R with a set of attributes A is a set of disjoint subsets $\{R_1, \ldots, R_n\}$ such that:

$$\forall i \in \{1, \ldots, n\}, R_i \neq \emptyset, R_i \subseteq R,$$

$$R = R_1 \cup R_2 \cup \ldots \cup R_n, \text{ and}$$

$$\forall i,j \in \{1, \ldots, n\}, i \neq j, R_i \cap R_j = \emptyset$$

Definition 2. Join Pair-Wise Partition Pruning by a join operator $\bowtie q$. Let $\{R_1; \ldots; R_n\}$ be a horizontal partitioning for a table R. Let $\{S_1; \ldots; S_m\}$ be a horizontal partitioning for a table S. We say that the pair $(R_j; S_k)$ is logically pruned by the join operator $\bowtie_{q(R;S)}$ if and only if $R_j \bowtie_{q(R;S)} S_k = \emptyset$ for any instances of the tables R and S. Let $\{R_1^i; \ldots; R_n^i\}$ be an instance of the table R, $R_i$, and $\{S_1^i; \ldots; S_m^i\}$ be an instance of the table S, $S_i$. We say that the pair of instances $(R_j^i; S_k^i)$ is dynamically pruned by the join operator $\bowtie_{q(R;S)}$ if and only if $R_j^i \bowtie_{q(R;S)} S_k^i \emptyset$.

Note that the condition for logical partition pruning $R_j \bowtie_{q(R;S)} S_k = \emptyset$ implies that $R \bowtie_{q(R;S)} S = (R \bowtie_{q(R;S)} S) \backslash (R_j \bowtie_{q(R;S)} S_k)$ for any instance of the tables R and S, while the condition for the dynamic partition pruning implies that $R^i \bowtie_{q(R;S)} S^i = (R^i \bowtie_{q(R;S)} S^i) \backslash R_j^i \bowtie_{q(R;S)} S_j^i))$ for specific instances $R^i$ and $S^i$ of the tables R and S, respectively.

Join logical partition pruning is based on the logical properties of the partitioning schemes for the two tables R and S where, for example, each partition is defined by a condition on one or more attributes of a table. As the partitioning properties hold for any instance of the database, the logical partition pruning can be applied during query optimization without accessing the current data stored in the partitions. Let $\{R1; \ldots; Rn\}$ be a horizontal partitioning of the table R, where each partition $R_i$ is defined by a condition $r_i(R)$ referencing only attributes of the table R: i.e., $R_i = \sigma_{ri(R)}(R) = \sigma_{ri(R)}(R_i)$. Similarly, let $\{S_1; \ldots; S_n\}$ be a horizontal partitioning of the table S, where each partition $S_i$ is defined by a condition $s_i(S)$ referencing only attributes of the table S: i.e., $S_i = \sigma_{si(S)}(S) = \sigma_{si(S)}(S_i)$. If a query Q referencing the join $(R \bowtie_{q(R;S)} S)$ has the join predicate $q(R; S)$ then:

$$R \bowtie_{q(R,S)} S = (R_1 \cup \ldots \cup R_n) \bowtie_{q(R,S)} (S_1 \cup \ldots \cup S_m) \quad \text{Equation (3)}$$

$$= ((\sigma_{r_1(R)} R_1) \cup \ldots \cup (\sigma_{r_n(R)} R_n)) \bowtie_{q(R,S)}$$

$$((\sigma_{s_1(S)} S_1) \cup \ldots \cup (\sigma_{s_m(S)} S_m))$$

$$= \bigcup\nolimits_{j \in \{1, \ldots, n\}, k \in \{1, \ldots, m\}} \left( (\sigma_{r_j(R)} R_j) \bowtie_{q(R,S)} (\sigma_{s_k(S)} S_k) \right)$$

$$= \bigcup\nolimits_{j \in \{1, \ldots, n\}, k \in \{1, \ldots, m\}} \left( R_j \bowtie_{q(R,S) \wedge r_j(R) \wedge s_k(S)} S_k \right).$$

If a predicate $q(R; S) \wedge r_j(R) \wedge s_k(S)$ can be proven to be a contradiction for any instance of the tables R and S, then the partition pair $(R_j; S_k)$ is pruned by the join operator $\bowtie_{q(R;S)}$ because $(R_j \bowtie_{q(R;S) \wedge r_j(R) \wedge s_k(S)} S_k) = (R_j \bowtie_{FALSE} S_k) = \emptyset$. Hence, $(R_j \bowtie_{q(R;S)} S_k)$ doesn't have to be computed during the execution of the query Q.

Example 1

Let $\{R_1; R_2\}$ be a partitioning of R(A) defined as $R_1 = \sigma_{R[A]>10}(R)$ and $R2 = \sigma_{(R[A]>10) \text{ IS NOT TRUE}}(R)$. Let $\{S_1; S_2\}$ be a partitioning of S(A) defined as $S_1 = \sigma_{S[A]<5}(T)$ and $S2 = \sigma_{(S[A]<5) \text{ IS NOT TRUE}}(S)$. Then, the pair $(R_1; S_1)$ is pruned by the join operator $\bowtie_{R[A]=S[A]}$. Proof $R_1 \bowtie_{R[A]=S[A]} S_1 = R_1 \bowtie_{R[A]=S[A]} \wedge_{R[A]>10} \wedge_{S[A]<5} S_1 = \emptyset$ because the predicate $R[A]=S[A] \wedge R[A]>10 \wedge [A]<5$ is a contradiction for any instances of the tables R partitioned as $\{R_1; R_2\}$ and S partitioned as $\{S_1; S_2\}$.

Example 2

Let $\{R_1; R_2\}$ be a horizontal partitioning of R(A). Let $\{S_1; S_2\}$ be a horizontal partitioning of S(A). Then, the pair $(R_1; S_2)$ is pruned by the join operator $\bowtie_{R[A]=S[A]}$ if it can be determined that the instances Si and Ri are such that $R_1^i \bowtie_{R[A]=S[A]} S_2^i =;$. One runtime criteria for determining that the pair $(R_1^i; S_2^i)$ is pruned by $\bowtie_{R[A]=S[A]}$ could be based on the current range values of the attribute A in the tables R and T. Note that the tuples with NULL value on A will not participate in the join.

Equation (4):

Let $\max(R_1^i[A]) = \max\{t[A] | t \in R_1^i\}$,
$\min(R_1^i[A]) = \min\{t[A] | t \in R_1^i\}$,
$\max(S_2^i[A]) = \max\{t[A] | t \in S_2^i\}$,
$\min(S_2^i[A]) = \min\{t[A] | t \in S_2^i\}$.
If $\max(R_1^i[A]) < \min(S_2^i[A])$ or
$\max(S_2^i[A]) < \min(R_1^i[A])$ then $R_1^i \bowtie_{R[A]=S[A]} S_2^i = 0$.
Proof If $\max(R_1^i[A])$ and $\min(R_1^i[A])$ are defined as above,
then $R_1^i = \sigma_{\min(R_1i\ [A]) \leq R[A] \leq \max(R_1i\ [A])}(R)$.
Similarly, $S_2^i = \sigma_{\min(S_2i\ [A]) \leq S[A] \leq \max(S_2i\ [A])}(S)$.
Then $R_1^i \bowtie_{q\ R[A]=S[A]} S_2^i =$
$R_1^i \bowtie_{q\ (R,S)} S_2^i = 0$ with $q(R, S) = (R[A] = S[A] \wedge$
$\min(R_1^i[A]) \leq R[A] \leq \max(R_1^i[A]) \wedge$
$\min(S_2^i[A]) \leq S[A] \leq \max(S_2^i[A]))$
because the join predicate $q(R, S)$ is a contradiction if
$\max(R_1^i[A]) < \min(S_2^i[A])$ or $\max(S_2^i[A]) < \min(R_1^i[A])$.

E. Access Pattern Awareness Based on Matching Dependencies

In the previous chapter the theoretical foundations for Join Pruning have been discussed. Now, example embodiments of computer systems that implement access pattern aware join pruning based on matching dependencies are described.

E.1 Theory of Matching Dependencies

Matching dependencies are well known in the art and can be used for defining extra relationships between matching tuples of two relations. The matching dependencies extend functional dependencies and were originally introduced with the purpose of specifying matching rules for object identifications. However, matching dependencies can also be defined in a database system and can be used to extend functional or inclusion dependencies supported in RDBMSs. They can be used to impose certain constraints on the data, or they can be dynamically determine for a query; they can be used for semantic transformations (i.e, query rewrite), and optimization of the query execution.

Definition 3. A matching dependency MD on two tables (R; S) is defined as following: The matching dependency $MD=(R; S; (q_1(R; S); q_2(R; S))$, where $q_1$ and $q_2$ are two predicates, is defined as a constraint of the form: if for any two tuples $r \in R$ and $s \in S$, $q_1(r; s)$ is true implies that $q_2(r; s)$ is true for any instances of the tables R and S. In other words, $q_1(R; S)$ is true implies that $q_2(R; S)$ is true.

Note that if a matching dependency $MD=(R; S; (q_1(R; S); q_2(R; S))$ holds, the following equality holds for any instance of the table R and S: $R \bowtie_{q_1(R;S)} S = R \bowtie_{q_1(R;S) \wedge q_2(R;S)} S$.

Example 3

Let $R(A;B)$ be a table with two attributes A;B, where the attribute A is the primary key for the table R. Let $S(C)$ be a table with an attribute C. Let a derived table $I(A;B;C)$ be defined as $I(A;B;C)=\Pi_{R[A];R[B];S[C]}(R \bowtie_{q(R;S)} S)$. Then the following matching dependency always holds between R(A; B) and I(A;B;C): $MD=(R(A;B); I(A;B;C); (R[A]=I[A]); (R[B]\ IS\ NOT\ DISTINCT\ FROM\ I[B]))$, where "X is not distinct from Y" is true if X=Y or X and Y are both NULL. In other words, for any two tuples $r \in R$ and $i \in I$, if $r[A]=i[A]$ then $r[B]$ IS NOT DISTINCT FROM $i[B]$ following the definition of the table $I(A;B;C)$ and the fact that the attribute $R[A]$ is the primary key for the table R.

Using the above-defined MD, a join between the table R and I (that is: $Q=R \bowtie_{R[A]=I[A]} I$) can be rewritten as $Q'= R \bowtie_{R[A]=I[A]} I = R \bowtie_{(R[A]=I[A])\ \wedge\ (R[B]\ IS\ NOT\ DISTINCT\ FROM\ I[B])} I$. In the context of the join partition pruning, if the partitioning schemes for R and I are defined using conditions on $R[B]$ and $I[B]$, respectively, then the rewritten query Q' can use logical or dynamic partition pruning as the join predicate references as well the attributes $R[B]$ and $I[B]$ and contradictions can be easily inferred.

E.2 Implementation

Specific semantic constraints among tables can be defined using MDs. Matching dependencies can be used to impose constraints on two tables which are joined together in queries: if two tuples agree on some attributes, then they must agree on some other attributes as well. An example thereof is: if two tuples agree on a product attribute, then they must agree on the product category attribute as well. By adding a temporal attribute such as a transaction id or a timestamp, one can use this type of constraint to model temporal locality semantics among relations.

According to one example embodiment, the application coupled to the database has an access pattern scenario with the following semantic constraints among at least one pair of tables to be joined: if a tuple r is inserted in the table R then a matching tuple s (where $r[A]=s[A]$, $A \subseteq attr(R)$ and $A \subseteq attr(S)$) is inserted in the table S in the same transaction as r is inserted, or within a access pattern distance d, which could be d or less transactions from r apart.

To model this type of semantic constraints, matching dependencies can be leveraged. The following designs can be imposed to define the matching dependencies between two tables R and S which will allow dynamic partition pruning for join queries using the aggregate cache. A new column $R[tid_A]$ is added which records the temporal property of the tuples in R as they are inserted into R. For example, $r[tid_A]$ can be set to the transaction identifier, an auto-incremented value, or the timestamp when the new tuple r is inserted, a value larger than any existing value already in the column $R[tid_A]$. For the table S, which is joined with the table R on the matching predicate $R[A]=S[A]$, a new column $S[tid_A]$ is added which is set, at the insert time, to the value of $R[tid_A]$ of the unique matching tuple in R, if at most one matching tuple exists, e.g. $R[A]$ is the primary key of R. This scenario is used in benchmarks described below, for which the corresponding matching dependency defined in Equation 5 holds with d=0. Similarly, if more than one matching tuple exists in R, $S[tid_A]$ can be set to its own transaction identifier, independent from $R[tid_A]$. In this scenario, the corresponding matching dependency defined in Equation 5 imposes the maximum desired distance d>=0 among transactions inserting matching tuples in R and S. For these scenarios, the following matching dependency holds:

$$MD_{R,S}=(R[A,tid_A],S[A,tid_A],(R[A]=S[A]),(|R[tid_A]-S[tid_A]|<=d)) \quad \text{Equation (5):}$$

The matching dependency $MD_{R,S}$ from Equation 5 can be used to perform dynamic pruning for the joins $R \bowtie_{R[A]=S[A]} S$. Let's assume that the tables R and S are partitioned as described in Example 2: $R=(R1;R2)$ and $S=(S1;S2)$, with S1 and R1 containing the most recent tuples of R and S, respectively. The dynamic pruning described in Example 2 can be attempted. Equation 6 shows the derived join predicate which must evaluate to false for pruning a subjoin.

$$R_1 \bowtie_{R[A]=S[A]} S_2 \text{ using } MD_{R,S} \text{ from } Eq.5 \quad \text{Equation (6)}$$

$$R_1 \bowtie_{R_1[A]=S_2[A] \land |R_1[tid_A]-S_2[tid_A]| <= d} S_2 =$$

$$R_1 \bowtie_{q(R_1,S_2)} S_2 \text{ where } q(R_1,S_2) \text{ is defined}$$

using min()/max() as in Example 2

$$q(R_1,S_2) = R_1[A] = S_2[A] \land |R_1[tid_A] - S_2[tid_A]| <= d \land$$

$$\min(R_1[tid_A]) \le R_1[tid_A] \le \max(R_1[tid_A]) \land$$

$$\min(S_2[tid_A]) \le S_2[tid_A] \le \max(S_2[tid_A])$$

If $q(R_1; S_2)$ can be proven to be a contradiction then $R_1 \bowtie_{R[A]=S[A]} S_2 = \emptyset$. The above technique for dynamic pruning must be done during runtime and it will be always correct as long as $MD_{R,S}$ holds. For example, a prefilter condition defined as in Equation 7, if true, assures that $q(R_1; S_2)$ is a contradiction hence the subjoin $R_1 \bowtie_{R[A]=S[A]} S_2 = \emptyset$ can be dynamically pruned.

$$\max(R_1[tid_A])+d<\min(S_2[tid_A]) \lor$$

$$\min(R_1[tid_A])>\max(S_2[tid_A])+d \quad \text{Equation (7);}$$

In the case of tables in a columnar IMDB, min( ) and max( ) can be obtained from current dictionaries of the respective partitions. The pruning will succeed if the prefilter from Equation 7 is true. Otherwise, the pruning will correctly fail if, for example, $MD_{R,S}$ holds but $S_2$ contains matching tuples from $R_1$ i.e., the prefilter is false in his case. For an empty partition $R_j$, we define min( ) and max( ) such that the prefilter is true for all join pairs $(R_j; S_k)$. When the database is aware of the enterprise application characteristics, join partition pruning can be used to efficiently execute join queries with or without aggregate cache. This type of joins is referred to as semantic or object-aware or application-access-pattern-aware joins. Let us consider the join query $Q(H; I)=H \bowtie_{H[PK]=I[FK]} I$ joining a header table H and item table I on the join condition H[PK]=I[FK]. It is known that application has the following semantic constraint: static business objects are inserted in the context of a single transaction, i.e., the header tuple and the corresponding item tuples are inserted in the same transaction. The matching dependency defined in Equation 8 captures this object-aware semantic constraint, where the attributes $H[tid_{PK}]$ and $I[tid_{FK}]$ are new attributes added for the matching dependency.

$$MD_{H,I}=(H,I,(H[PK]=I[FK]),(H[tid_{PK}]=I[tid_{FK}])) \quad \text{Equation (8):}$$

Figure 4:
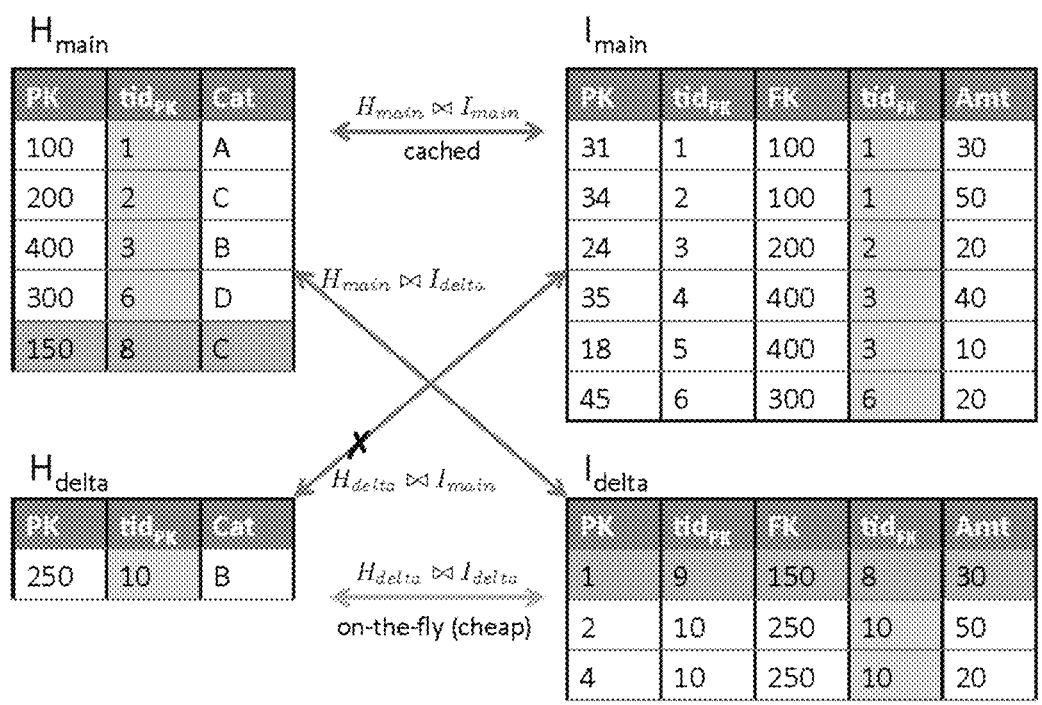
FIG. 4 shows an example of join dynamic pruning for the subjoin $H_{delta} \bowtie_{H[PK]=I[FK]} I_{main} = \emptyset$ where the prefilter min$(H_{delta}[t_{PK}])$>max$(I_{main}[t_{FK}])$ (i.e., 10>6) is true.

FIG. 4 depicts an example of join dynamic pruning for the subjoin $H_{delta} \bowtie_{H[PK]=I[FK]} I_{main} = \emptyset$ because the prefilter min $(H_{delta}[t_{PK}])>\max(I_{main}[t_{FK}])$ (i.e., 10>6) is true. However, the subjoin $H_{main} \bowtie_{H[PK]=I[FK]} I_{delta}$ cannot be pruned: the prefilter $\max(H_{main}[tPK])<\min(I_{delta}[tFK])$ (i.e., 8<8) is false. FIG. 4 shows the matching tuples in $H_{main}$ and $I_{delta}$ which prevent the join pruning for $H_{main} \bowtie_{H[PK]=I[FK]} I_{delta}$. After an insert into H and I, if there was no merge operation yet, all new matching tuples are in the delta partitions. Therefore, for a query, one only needs to compute the subjoin $H_{delta} \bowtie I_{delta}$ and unify the results with the cached aggregate ($H_{main} \bowtie I_{main}$). Dynamic pruning for the remaining subjoins $H_{main} \bowtie I_{delta}$ and $I_{main} \bowtie H_{delta}$ can be performed if the prefilter condition as defined in Equation 7 holds:

$$\max(H_{main}[tid_{PK}])<\min(I_{delta}[tid_{FK}]) \rightarrow$$
$$H_{main} \bowtie I_{delta} = \emptyset$$

$$\min(I_{main}[tid_{FK}])<\min(H_{delta}[tid_{PK}]) \rightarrow$$
$$I_{main} \bowtie H_{delta} = \emptyset$$

The three table join depicted in FIG. 2 can be pruned the same way. In this example, the subjoins #2, #4, #6 and #7 can all be omitted, since the header and item tuples that belong together are either all in the main or delta partitions. If there were no inserts in the dimension table since the last merge, the delta of that table is empty. For inner joins, empty table components do not need to be included since they will not contribute to the result set. Therefore, the subjoins #2 and #3 can also be pruned. This pruning method could also be applied if there would be a greater number of involved dimension, text, or configuration tables with empty deltas. This only leaves the subjoin #1, between the header-delta, item-delta, and the main of the small dimension table.

F. Alternative Access Pattern Aware Joins

For implementation of the access pattern aware joins, the database engine needs to know which table columns are referenced by the join conditions. Apart from the matching dependency method explained above, there are two other example implementations with different strengths and weaknesses:

According to a first implementation, Foreign Keys are defined on the database level during the design time of the schema. They are a well-established mean in many database systems. A column is marked to match the key of another table. New inserts, updates and deletes are checked for data integrity of defined foreign keys. The checking mechanism may decrease OLTP throughput performance.

According to a second implementation, a domain specific language (DSL) is used to model objects on database level. The database creates the CREATE TABLE statements from the abstract data modeling language. The DSL supports syntax to explicitly express associations between objects. The following listing shows an example syntax similar to the CDS-DDL3 from SAP HANA (note that an AccountingItem can, but does not have to be associated with a Product):

```
entity AccountingItem{
    key ID:    int;
    Product:   association [0..1] of Product;
    Quantity:  int}
entity Product{
    key ID:    int;
    Name:      string}
```

G. Benchmarks

Two sets of experiments have been performed in order to quantify the benefits associated with the invention described herein (Section G.1 and G.2):

G.1 First Set of Experiments

The first set of experiments serve the purpose of evaluating the potential speedup of semantic joins compared to joins without using schema usage characteristics, the caching mechanism used with a fully denormalized schema and using no caching mechanism at all. For the evaluation, a real customer data set of an SAP financials system of an international company producing consumer goods is used. The schema limited to the benchmark relevant tables and columns looks similar to the one displayed in FIG. 2. The data set consists of 35 million AccountingHeader tuples, 310 million AccountingItem tuples and the text tables have each less then 2000 entries. A generated OLAP workload is used, which simulates multiple users, using a profit and loss statement (P&L) analysis tool. The SQL statements calculate the profitability for different dimensions like product category and subcategory by aggregating debit and credit entries.

The following listing shows a simplified sample query that calculates how much profit the company made with each of its product categories:

SELECT D. Name AS Category, SUM(I. Price) AS Profit
    FROM AccountingHeader AS H,
        AccountingItem AS I,
        ProductCategory AS D
    WHERE I. AccountingHeaderID=H. AccountingHeaderID
        AND I. CategoryID=D. CategoryID
        AND D. Language='ENG'
    GROUP BY I. CategoryID A drill down into the (P&L) is simulated by applying a specific dimension value as filter and then grouping by another dimension. E.g. "List how much profit the different products of the popcorn category made in November of 2013 in the State of Brandenburg (Germany)". 5 Object Relational Mapper, A framework to easy access to relational databases from object oriented programming languages This first set of experiments is run on a server with 64 Intel Xeon QPI7 enabled processor cores and 1 TB of RAM running SansoucciDB, an in-memory column-oriented research database (see also FIG. 1).

(a) Delta Size

Figure 5:
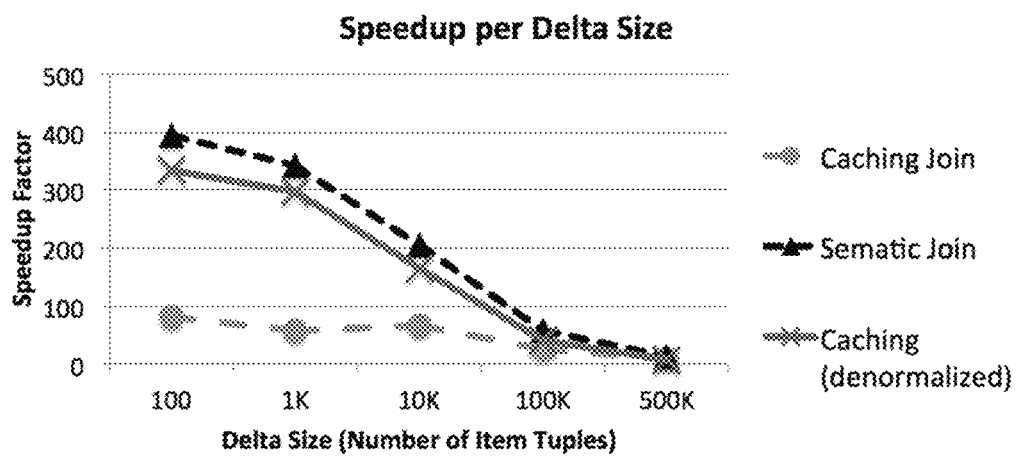
FIG. 5 shows the speedup factor of the different caching strategies compared to the caching mechanism running on a fully denormalized table.

The speed up of the aggregate caching mechanism greatly depends on the size of the Delta storage. The smaller the Delta in respect to the Main storage, the less tuples need to be aggregated when rerunning cached queries. How large the peak delta size is just before merging, depends on the insert rate and how long it takes to merge the table. FIG. 5 shows the speedup factor of the different caching strategies compared to the caching mechanism running on a fully denormalized table. For the denormalized caching, the speedup is calculated by comparing it to the runtime on the denormalized table without caching. For this specific benchmark, only a two table Join between the Header and Item table was used. In that case, the strategy not leveraging enterprise application characteristics also performs better by magnitudes since it never has to do the HeaderMain-ItemMain Join. The Semantic Join enables a speedup of greater then 200 for Deltas smaller then 10 thousand tuples and greater then 50 with less then 100 thousand tuples. Even for larger Deltas with half a million entries, cached queries are calculated thirteen times faster then without caching (117 ms compared to 1.58 seconds).

(b) Three Tables

Figure 6:
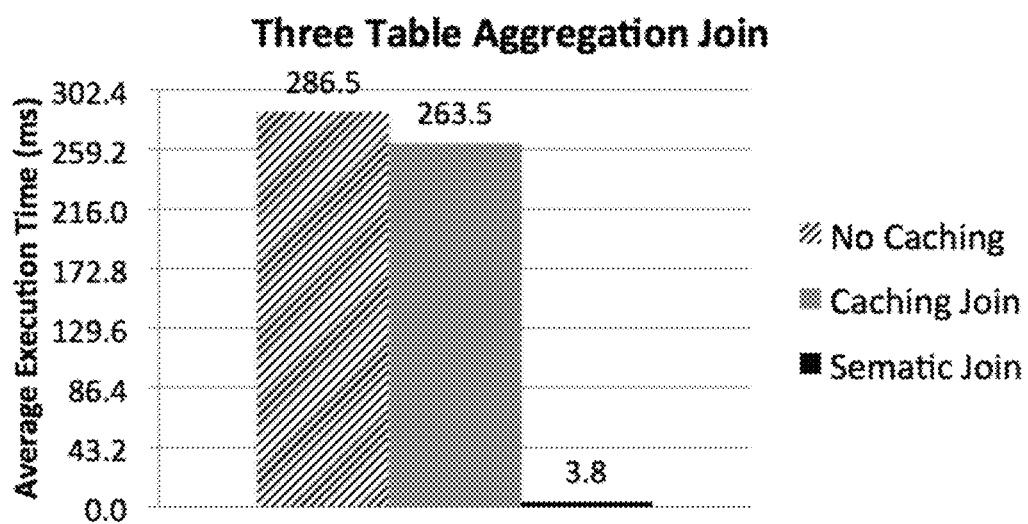
FIG. 6 shows benchmark results for aggregation queries joining Header, Item, and one Dimension tables.

For an aggregation query joining three tables, the caching mechanism has to join the large HeaderMain and ItemMain. In this benchmark, Deltas with 50 thousand Item tuples and their corresponding Header tuples are used. The Dimension table consisted of 150 entries. FIG. 6 shows the importance of utilizing schema usage characteristics once there are three or more tables involved. The analytical queries of the analyzed customer typically involve three to seven tables. Since the semantic caching strategy only joins rather small table components, its execution time remains faster by an order of magnitudes, even if more tables are involved.

G.2 Second Set of Experiments

In a second set of experiments, the proposed join pruning concept has been prototypically implemented in SAP HANA. Several benchmarks have been created several based on real customer data and workloads. The application coupled to the database was a financial application with data from a real industry customer instead of a standardized benchmark such as TPCC (an on-line transaction processing benchmark of the Transaction Processing Performance Council) or TPC-H (an ad hoc decision support benchmark transaction of the Transaction Processing Performance Council) because it reflects the characteristics of enterprise applications, generating mixed workloads. The schema—limited to the benchmark relevant tables and columns—is similar to the one illustrated in FIG. 2. The data set consists of 35 million tuples in the header table AccountingHeader, 310 million tuples in the item table AccountingItem, while the dimension table ProductCategory has less than 2000 tuples. A mixed OLTP/OLAP workload was modeled, based on input from interviews with that customer. The analytical queries simulate multiple users, using a profit and loss statement (P&L) analysis tool. The SQL statements calculate the profitability for different dimensions like product category by aggregating debit and credit entries. The following Listing shows a simplified sample query that calculates how much profit the company made with each of its product categories:

SELECT D. Name AS Category, SUM(I. Price) AS Profit
    FROM AccountingHeader AS H,
        AccountingItem AS I,
        ProductCategory AS D
    WHERE I. AccountingHeaderID=H. AccountingHeaderID
        AND I. CategoryID=D. CategoryID
        AND D. Language='ENG'
    GROUP BY I. CategoryID All benchmarks are run on a server with 64 Intel Xeon X7560 processor cores and 1 TB of main memory.

(a) Single Table Performance

Figure 7:
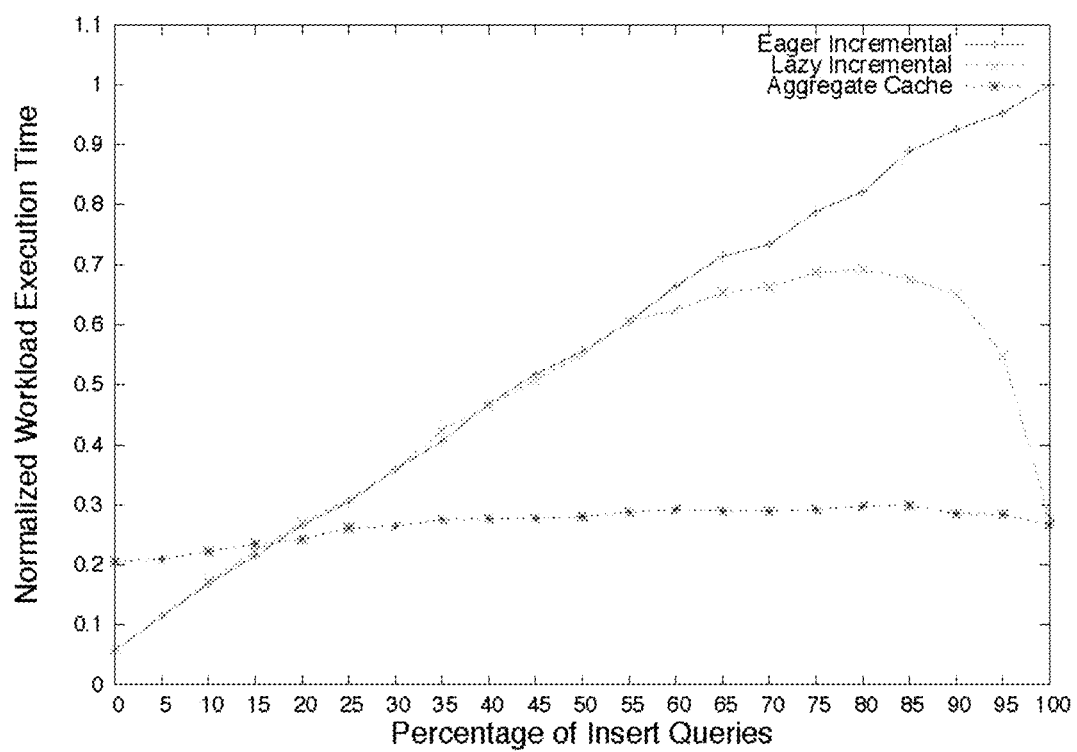
FIG. 7 shows normalized execution times of using the aggregate cache strategy compared to using materialized views with two most prominent maintenance strategies.

Before discussing the insert overhead and the join pruning benefit, it is shown how a mixed workload of inserts and aggregate queries performs using the aggregate cache (defined on the main partitions) compared to using materialized views with classical maintenance strategies. In FIG. 7, the normalized execution times of using the aggregate cache is compared to using materialized views with two most prominent maintenance strategies: eager incremental strategy maintains the materialized views with every new insert operation, while lazy incremental strategy keeps a log of insert operations and maintains the materialized views only when a query is executed. In this benchmark, the mixed workload consists of aggregate queries and single record inserts that affect the materialized aggregates. With a total of 10 thousand queries, the percentage of insert queries (the x-axis) among them is varied. In other words, the results on the far left of the x-axis (0% inserts) represent a select-only workload whereas the results on the far right correspond to an insert-only workload (100% inserts). The main store contains 1 million records and the delta store 10 thousand records. The graph shows the total workload execution time consisting of the time to access the aggregate cache during query execution, the time for the aggregate maintenance, and the time for insert operations. For small insert ratios, the existing maintenance strategies have the best performance because only little maintenance is necessary. With an increasing insert ratio however, their maintenance costs increase while the aggregate cache delivers nearly constant execution times due to the fact that the aggregate cache is defined on main stores. For insert ratios above 15 percent, the aggregate cache outperforms existing strategies.

(b) Memory Consumption Overhead

In the present scenario, there are three tables (header, item, and one dimension table) that need to be extended with the temporal information in order to prune the subjoins. In total, this adds up to the following five additional attributes in the delta storage:

Header table: AccountingHeader[tid$_A$ccountingHeaderID]

Item table: AccountingItem[tidItemID; tid$_A$ccountingHeaderID; tidCategoryID]

Dimension table: ProductCategory[tidCategoryID]

The measured memory consumption with 2.7 thousand header tuples, 270 thousand item tuples, and an empty dimension table in the delta was 78,553 KB compared to 69,507 KB without the temporal information. This is an overhead of 13 percent, but only applies to the delta partition, as one does not need this information on the main partition of the tables. Since in most scenarios, the delta partition contains less than one percent of tuples of the main storage, the memory consumption overhead is negligible.

(c) Insert Overhead

Figure 8:
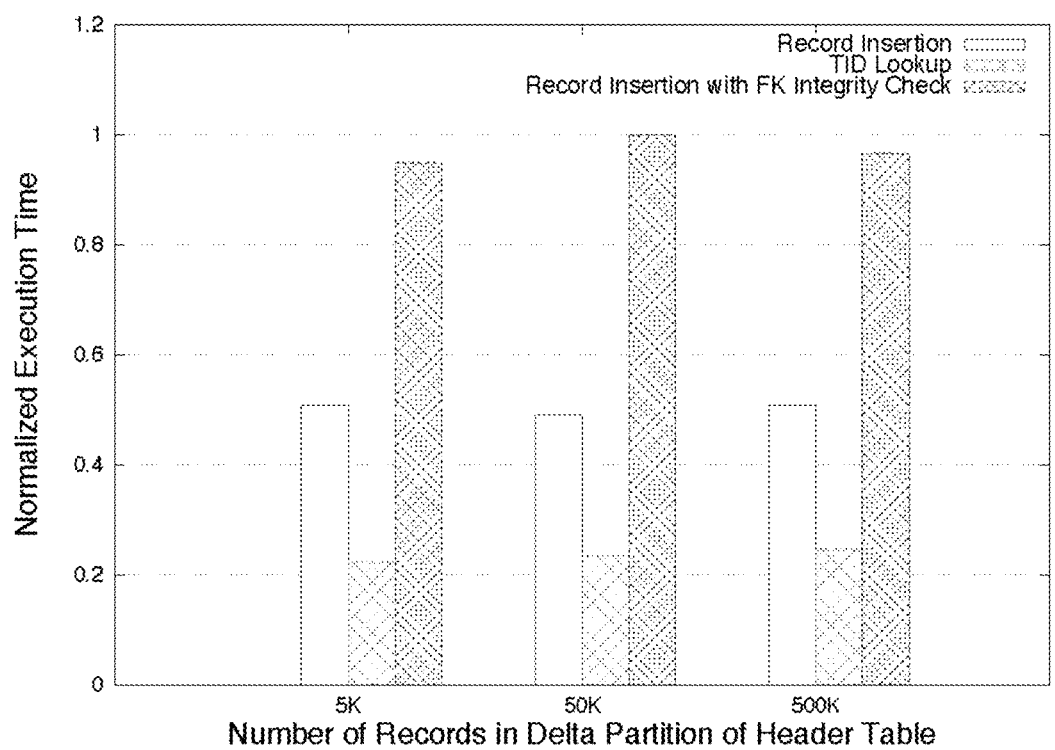
FIG. 8 shows record insertion and matching tid lookup times compared to an insert with a foreign key integrity check.

To ensure the matching dependencies of records with foreign keys, every insert operation involving a foreign key attribute needs to find the related temporal attribute of the matching tuple. To benchmark this overhead, the time for the look-up of the tid$_A$ccountingHeaderID attribute of the AccountingHeader table was measured for every insert of a record in the AccountingItem table. When the matching AccountingHeader record is already merged to the main partition of the AccountingHeader table, one does not need to look-up the tid$_A$ccountingHeaderID in the main partition but can set it to max(AccountingHeadermain[tid$_A$ccountingHeaderID]) which can be directly looked up in the sorted attribute dictionary without any scan effort. The results in FIG. 8 show that while an average single record insertion is independent of the number of records in the delta partition of the AccountingHeader table, the execution time of a tid lookup slightly increases. However, this look-up can be combined with an integrity check for inserted records with foreign keys that require the lookup of the matching primary key attribute in any case. For this reason, the record insertion time was included with foreign key integrity checks.

(d) Join Pruning Benefit

To measure the benefit of the proposed join pruning approach, two benchmarks were created. The following four different join query execution strategies on the three table setup were compared (header, item, and one dimension table):

Uncached aggregate query: this executes an aggregate query without using the aggregate cache, Cached aggregate query without pruning: while the main partition is cached, all remaining partitions including the delta partitions are queried, Cached aggregate query with empty delta pruning: as an optimization to the previous strategy, joins with empty delta partitions were omitted as it is the case with the ProductCategory dimension table, and Cached aggregate query with full pruning: this strategy uses the dynamic pruning concept.

Figure 9:
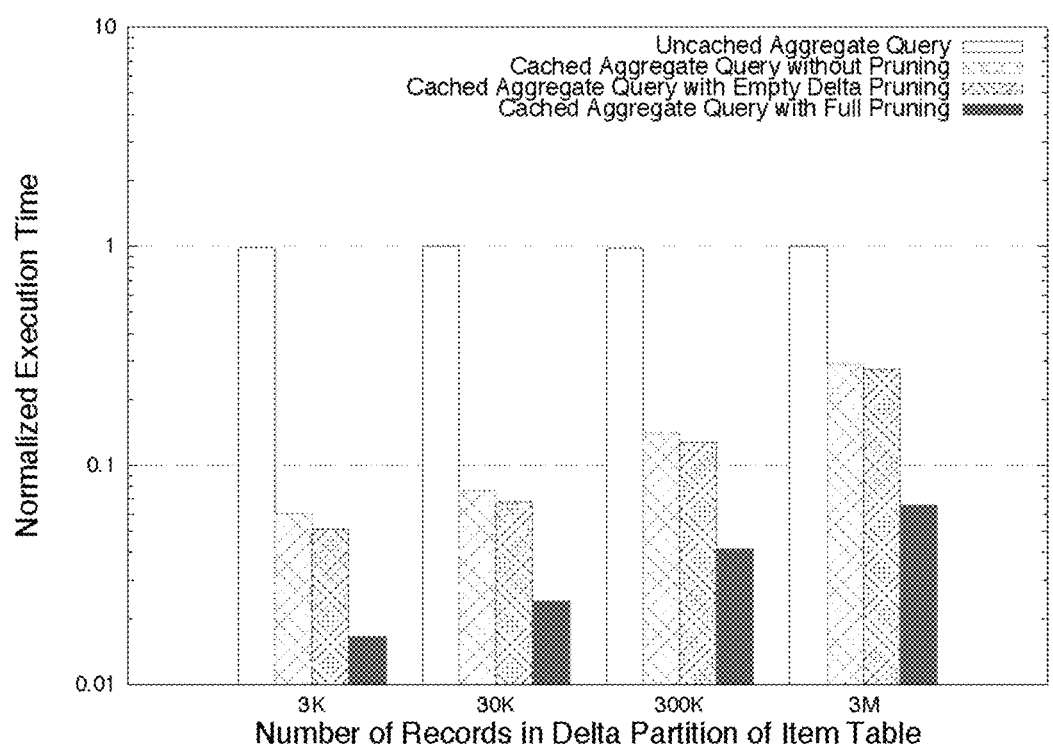
FIG. 9 shows the join performance with and without the aggregate cache and join pruning benefit based on different delta sizes.
Figure 10:
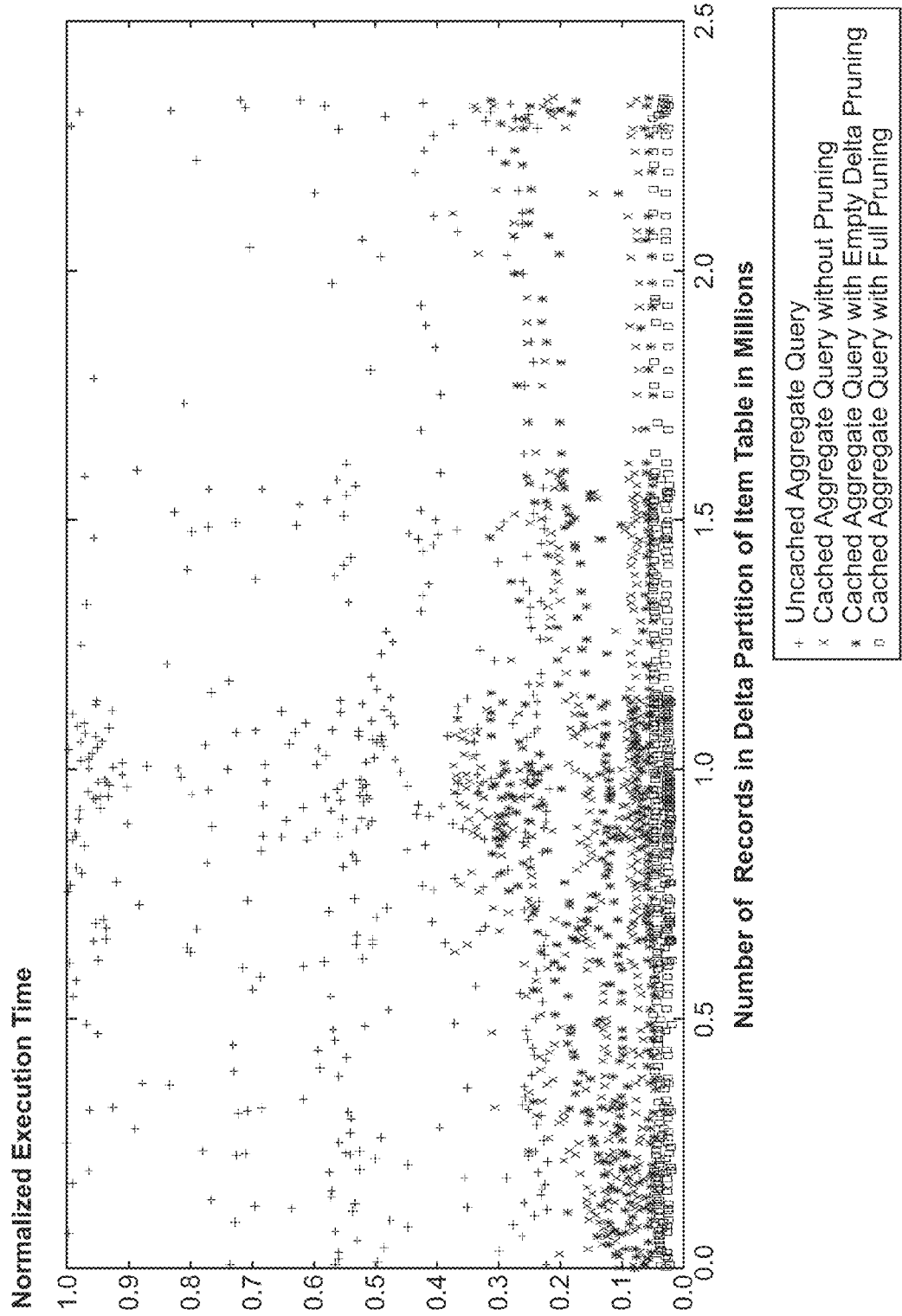
FIG. 10 shows the join performance with and without the aggregate cache and join pruning benefit based on growing delta sizes.

The first benchmark as illustrated in FIG. 9 measures the execution times of the four different join approaches based on five different delta sizes of the AccountingItem table ranging from 300 thousand to 3 million records. The delta partition of the AccountingHeader table contains approximately one tenth of the AccountingItemdelta table records and the delta partition of the ProductCategory table is empty. The workload for this benchmark contains 100 aggregate join queries similar to the query in the abovementioned Listing. FIG. 9 shows the average normalized execution times of these queries. One sees that a query which does not use the cached aggregate takes, on average, one time unit while the query using the cached aggregate can be answered by an order of magnitude faster for small delta sizes. With an increasing number of records in AccountingItemdelta and AccountingHeaderdelta the query execution time increases regardless of the applied join pruning strategy because the newly inserted records in the delta partitions have to be aggregated to compute the query results. While the empty delta pruning delivers performance improvements of around 10 percent, the execution times using the full pruning approach is, on average, three times faster than using the cached aggregates without any dynamic join pruning. In the second benchmark (see FIG. 10), a mixed workload was created consisting of insertions of records into AccountingHeader and AccountingItem tables and the execution of aggregate join queries. The starting point is an empty delta partition of both the AccountingHeader and AccountingItem tables. The benchmark then starts the insertion of records in both tables including the look-ups of tid attributes. At the same time, monitor the execution times for aggregate queries executed with the four different strategies were monitored. The benchmark has varying frequencies of aggregate queries with respect to the number of inserts which is realistic in an enterprise application context. For example, one can see that there are many aggregate queries at the point of time when AccountingItemdelta contains around 1 million records. The results in FIG. 10 show that while the empty delta pruning has minor performance advantages over not pruning at all, the proposed join pruning approach outperforms both when the delta partitions have non-trivial sizes. One also sees that the runtime variance of queries with or without the aggregate cache but without any pruning is very high. This can be explained by a high concurrent system load which, due to the complexity of the monitored aggregate queries, results in variable execution times.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

The invention claimed is:

1. A computer system for determining a result of a join, the computer system comprising:
 a processing unit;
 a database coupled to the processing unit,
  the database comprising:
   a first table, and
   a second table,
    each of the first table and the second table being partitioned into at least two partitions, including a first partition of the first table, a second partition of the first table, a first partition of the second table, and a second partition of the second table,
  the database being coupled to an application that, in operation, accesses the database according to an access pattern; and a database engine executable by the processor and communicatively coupled to the database, the database engine being configured for determining a join between the first table and the second table by:
inferring from the access pattern of the application that at least one of a plurality of subjoins is empty, wherein the plurality of subjoins includes a first subjoin between the first partition of the first table and the first partition of the second table, a second subjoin between the first partition of the first table and the second partition of the second table, a third subjoin between the second partition of the first table and the first partition of the second table, and a fourth subjoin between the second partition of the first table and the second partition of the second table;
determining a plurality of results for the plurality of subjoins excluding the at least one of the plurality of subjoins that was inferred to be empty; and
combining the plurality of results that exclude the at least one of the plurality of subjoins that was inferred to be empty.

2. The computer system according to claim 1,
wherein the join has a join condition condition between the first table and the second table, and
wherein according to the access pattern, tuples in the first table and the second table are stored so that a tuple in the first table and a tuple in the second table that match according to the join condition are both either in the respective first partition or the respective second partition so that it can be inferred from the access pattern that the result of any subjoin between a first partition of one of the tables and a second partition of the other of the tables is empty.

3. The computer system according to claim 1,
wherein the computer system further comprises a high level application programming interface (API) for data manipulation so that data manipulation on the database is restricted to this high level API,
wherein the high level API enforces a certain data access pattern, wherein, advantageously, the database is only accessible via the high level API.

4. The computer system according to claim 1,
wherein the database engine is further configured for:
caching the result of a subjoin in a cache store; and
determining the result of at least one of the plurality of subjoins from the cached result for the purpose of determining the join of the first table and the second table.

5. The computer system according to claim 1,
wherein the database engine is configured for determining the results of all those subjoins that cannot be determined by inference from the access pattern or by retrieving a cached result by executing a join operation on the corresponding partitions of the first table and the second table.

6. The computer system according to claim 1,
wherein the database engine is further configured for merging content of the first partition of one of the first table and the second table into the second partition of the one of the first table and the second table.

7. The computer system according to claim 1,
wherein each of the first table and the second table has a special column, and
wherein according to the access pattern, the result of a subjoin between one partition of the first table and one partition of the second table is empty when a first interval between a first minimum value and a first maximum value contained in the special column of the one partition of the first table is further than an access pattern distance apart from a second interval between a second minimum value and a second maximum value contained in the special column of the one partition of the second table.

8. The computer system according to claim 7, wherein the special column is configured for storing a special attribute, including at least one of a transaction identifier, an auto-incremented value, and a timestamp of tuple insertion.

9. The computer system according to claim 7, wherein according to the access pattern, when a new tuple is inserted into the first table and the second table, a value of the new tuple is either always larger than or always smaller than any other value existing already in the special column.

10. The computer system according to claim 7, wherein the step of inferring from the access pattern of the application that at least one of the plurality of subjoins is empty includes:
determining that the first interval between the first minimum value and the first maximum value contained in the special column of the one partition of the first table is further than the access pattern distance apart from the second interval between the second minimum value and the second maximum value contained in the special column of the one partition of the second table, by evaluating at least one of the following expressions:

$$\max(R_1[\text{tid}_A])+d<\min(S_2[\text{tid}_A]) \text{ OR } \min(R_1[\text{tid}_A])>\max(S_2[\text{tid}_A])+d$$

$$\max(R_1[\text{tid}_A])+d<\min(S_1[\text{tid}_A]) \text{ OR } \min(R_1[\text{tid}_A])>\max(S_1[\text{tid}_A])+d$$

$$\max(R_2[\text{tid}_A])+d<\min(S_2[\text{tid}_A]) \text{ OR } \min(R_2[\text{tid}_A])>\max(S_2[\text{tid}_A])+d$$

$$\max(R_2[\text{tid}_A])+d<\min(S_1[\text{tid}_A]) \text{ OR } \min(R_2[\text{tid}_A])>\max(S_1[\text{tid}_A])+d$$

wherein $\text{tid}_A$ is the special column, $R_1$ is the first partition of the first table, $R_2$ is the second partition of the first table, $S_1$ is the first partition of the second table, $S_2$ is the second partition of the second table, and d is the access pattern distance.

11. The computer system according to claim 7, wherein the access pattern distance is 0 or larger than 0.

12. The computer system according to claim 7, wherein the access pattern distance is larger than 0.

13. The computer system according to claim 1, wherein when the database engine infers that the result for one of the plurality of subjoins is empty, the database engine combines the plurality of results for the plurality of subjoins without the at least one of the plurality of subjoins that was inferred to be empty.

14. The computer system according to claim 1, wherein combining the plurality of results for the plurality of subjoins that are not empty improves the functioning of the computer system as compared to combining the plurality of results for all the plurality of subjoins.

15. The computer system according to claim 1, wherein combining the plurality of results for the plurality of subjoins that are not empty improves the functioning of the computer system by avoiding accessing irrelevant data.

16. The computer system according to claim 1, wherein combining the plurality of results for the plurality of subjoins that that are not empty improves the functioning of the computer system by avoiding an expensive subjoin.

17. A method for determining a result of a join, the method comprising the following steps:
    providing
        a processing unit;
        a database coupled to the processing unit,
            the database comprising:
                a first table, and
                a second table,
                    each of the first table and the second table being partitioned into at least two partitions, including a first partition of the first table, a second partition of the first table, a first partition of the second table, and a second partition of the second table,
            the database being coupled to an application that, in operation, accesses the database according to an access pattern,
        a database engine executable by the processor and communicatively coupled to the database,
    the database engine determining a join between the first table and the second table by:
        inferring from the access pattern of the application that at least one of a plurality of subjoins is empty, wherein the plurality of subjoins includes a first subjoin between the first partition of the first table and the first partition of the second table, a second subjoin between the first partition of the first table and the second partition of the second table, a third subjoin between the second partition of the first table and the first partition of the second table, and a fourth subjoin between the second partition of the first table and the second partition of the second table;
        determining a plurality of results for the plurality of subjoins excluding the at least one of the plurality of subjoins that was inferred to be empty; and
        combining the plurality of results that exclude the at least one of the plurality of subjoins that was inferred to be empty.

18. A non-transitory machine-readable medium storing a computer program that when executed by a computer system implements a method for determining a result of a join, wherein the computer system includes a processor and a memory, the method comprising:
    providing
        a processing unit;
        a database coupled to the processing unit,
            the database comprising:
                a first table, and
                a second table,
                    each of the first table and the second table being partitioned into at least two partitions, including a first partition of the first table, a second partition of the first table, a first partition of the second table, and a second partition of the second table,
            the database being coupled to an application that, in operation, accesses the database according to an access pattern,
        a database engine executable by the processor and communicatively coupled to the database,
    the database engine determining a join between the first table and the second table by:
        inferring from the access pattern of the application that at least one of a plurality of subjoins is empty, wherein the plurality of subjoins includes a first subjoin between the first partition of the first table and the first partition of the second table, a second subjoin between the first partition of the first table and the second partition of the second table, a third subjoin between the second partition of the first table and the first partition of the second table, and a fourth subjoin between the second partition of the first table and the second partition of the second table;
        determining a plurality of results for the plurality of subjoins excluding the at least one of the plurality of subjoins that was inferred to be empty; and
        combining the plurality of results that exclude the at least one of the plurality of subjoins that was inferred to be empty.

\* \* \* \* \*